US012639820B2

(12) United States Patent
Dhanuka et al.

(10) Patent No.: US 12,639,820 B2
(45) Date of Patent: May 26, 2026

(54) REGION DETECTION FOR INTERTWINING OF VECTOR OBJECTS

(71) Applicant: ADOBE INC., San Jose, CA (US)

(72) Inventors: Praveen Kumar Dhanuka, Howrah (IN); Mohammad Zeeshan Ahmad, Ranchi (IN); Harish Kumar, Noida (IN)

(73) Assignee: Adobe Inc., San Jose, CA (US)

( * ) Notice: Subject to any disclaimer, the term of this patent is extended or adjusted under 35 U.S.C. 154(b) by 308 days.

(21) Appl. No.: 18/224,480

(22) Filed: Jul. 20, 2023

(65) Prior Publication Data

US 2025/0029259 A1     Jan. 23, 2025

(51) Int. Cl.
| | |
|---|---|
| *G06T 7/12* | (2017.01) |
| *G06T 5/77* | (2024.01) |
| *G06T 11/60* | (2026.01) |

(52) U.S. Cl.
CPC .................. G06T 7/12 (2017.01); G06T 5/77 (2024.01); G06T 11/60 (2013.01); *G06T 2200/24* (2013.01); *G06T 2207/20116* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 7,502,028 B1 * | 3/2009 | Asente ..................... | G06T 11/40 345/589 |
| 2006/0001679 A1 * | 1/2006 | Hamburg ................ | G06T 11/60 345/620 |
| 2011/0197164 A1 * | 8/2011 | Ahn ...................... | G06F 3/0488 715/810 |

OTHER PUBLICATIONS

Asente P. J., "Folding avoidance in skeletal strokes", In Proceedings of the Seventh Sketch-Based Interfaces and Modeling Symposium (SBIM), Eurographics Association, pp. 33-40 (2010).
Kumar, H., and Dhanuka, P. K., "Visual Reordering of Partial Vector Objects", pp. 1-54 (Aug. 26, 2022).
Kumar, H. et al., "Modifying Digital Images Via Adaptive Rendering Order of Image Objects", pp. 1-59 (2023).
Kumar, H. et al., "Scene Graph Structure Generation and Rendering", pp. 1-49 (Jan. 27, 2023).
Adobe Systems Inc., "Adobe illustrator cs2 user guide", pp. 567 (2005).

* cited by examiner

*Primary Examiner* — Yanna Wu
(74) *Attorney, Agent, or Firm* — Shook, Hardy & Bacon L.L.P.

(57) ABSTRACT

In various examples, a region including at least two vector objects that can be intertwined is determined. For example, vector objects can be intertwined by at least determining a set of outlines for the vector objects and detecting regions within which the vector objects overlap. In such examples, a visual order of the vector objects is determined based on an input from a user.

20 Claims, 11 Drawing Sheets

400A

400B

500

502

PATTERN BRUSH

504

INTERNAL
DISCRETE RIBS

506

OUTLINE OF RIBS

506

FINAL OUTLINE OF
ENTIRE PATH

900

DETERMINE OUTLINES FOR
VECTOR OBJECTS IN IMAGE 902

DETERMINE REGIONS OF
OVERLAPPING VECTOR OBJECTS
IN IMAGE BASED ON OUTLINES
904

DETERMINE VISUAL ORDER
ASSOCIATED WITH VECTOR
OBJECTS WITH REGIONS 906

RESOLVE RENDERING ARTIFACTS
908

1000

CONVERT VECTOR OBJECT TO GRAPHIC PRIMITIVES <u>1002</u>

COMBINE GRAPHIC PRIMITIVES USING BOOLEAN OPERATIONS <u>1004</u>

DETERMINE OUTLINE OF VECTOR OBJECT <u>1006</u>

REGION DETECTION FOR INTERTWINING OF VECTOR OBJECTS

BACKGROUND

In order to generate realistic images, some image processing applications enable localized reordering of portions of vector objects to create an appearance of depth between the portions of the vector objects. For example, in some cases, portions of vector objects are reordered such that some portions of a first vector object appear above a second vector object, while other portions of the first vector object appear below the second vector object. In order to generate such an "intertwined" appearance between the first and second vector objects using conventional systems, a user edits the vector objects by at least manually adding and/or removing portions of the first and second vector objects to create the appearance of depth. This process is tedious and prone to user error. Further, such manual modification of vector objects can also result in destruction of original geometries of the first and second vector objects.

SUMMARY

Embodiments described herein are directed to automatically detecting regions associated with overlapping vector objects to enable intertwining of the vector objects within an application for displaying and/or editing digital content. Advantageously, in various embodiments, the systems and methods described are directed toward automatically detecting visually overlapping areas, without user intervention, and enabling generation of intertwining objects, for example, based on user input. In particular, a user interface automatically provides a visual indication of a region containing overlapping portions of two or more objects (e.g., vector objects) and enables the user to select an object of the two or more objects to be displayed on top of the overlapping portions of the other objects, thereby providing the appearance of intertwining objects.

For example, assume a first vector object and a second vector object are displayed, via a user interface. In this example, as the input device hovers over a region including the first vector object and the second vector object (e.g., a region where the first vector object and the second vector object overlap), a region indicator is displayed in the user interface indicating that an intertwining operation is available for the region. Now assume the user is interested in intertwining the first vector object and the second vector object in the overlapping region. In such a case, the user can provide an input though the input device (e.g., clicking on the region within the user interface) to initiate modification of the first vector object and the second vector object such that the portions of the first vector object and the second vector object that overlap are intertwined (e.g., the vector object selected by the user is displayed on top).

In operation, outlines for a set of vector objects displayed are determined and used to detect object-level overlapping regions of the set of vector objects. In one example, once the regions are detected (e.g., based on the boundaries and/or outlines of the set of vector objects), the visual order of the set of vector objects is computed within the regions. Each region, in various embodiments, is mutually exclusive and contains a single visual order associated with the set of vector objects within the region. In some examples, this allows for two or more vector objects to be intertwined within a plurality of different regions (e.g., having different z-orderings). Furthermore, the visual order for the set of vector objects, in various examples, is determined based on cursor location within the region. In addition, in some examples, determining the boundaries based on the outline of vector objects can cause the application to render artifacts due to numerical precision issues. In such examples, additional pixels are added to the boundary of the vector objects to avoid visual rendering issues as a result of the numerical precision issues.

BRIEF DESCRIPTION OF THE DRAWINGS

The present invention is described in detail below with reference to the attached drawing figures, wherein.

DETAILED DESCRIPTION

Figure 1:
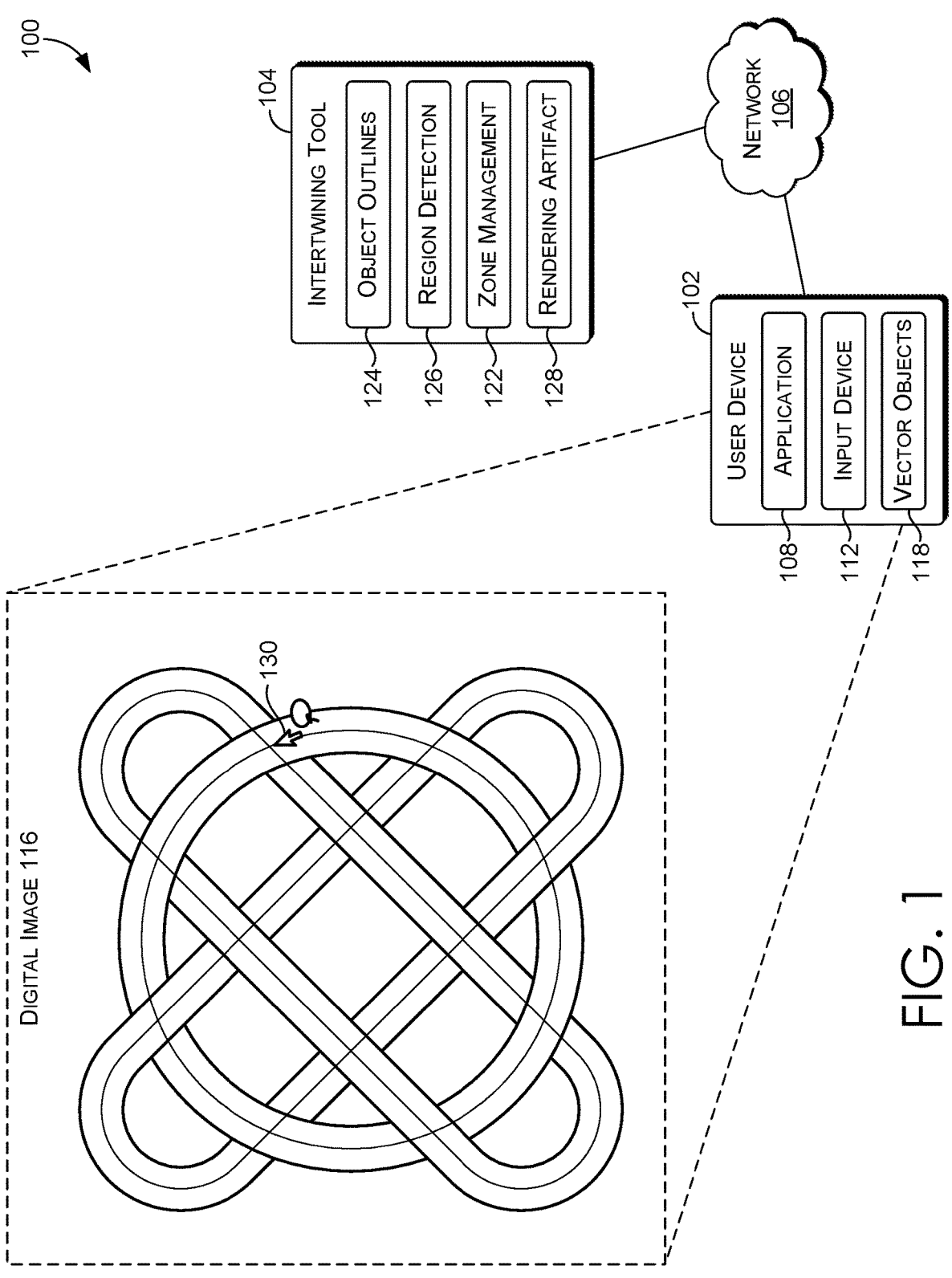
FIG. 1 depicts an environment in which one or more embodiments of the present disclosure can be practiced.

Embodiments described herein generally relate to detecting regions of overlapping vector objects to enable an application (e.g., an application for displaying and/or editing digital content such as images) to intertwine the vector objects. Advantageously, aspects of the technology described herein provide a number of improvements over existing technologies. For instance, techniques used to edit the vector object make it difficult or tedious to achieve certain visual appearances or effects. An example of this includes intertwined objects, which involves a connection between the objects that are twined together such that the objects overlap and/or intersect each other, often multiple times in a z-direction. Examples of intertwined objects include chain links, the Olympic® rings, and so forth. Conventional techniques to support intertwining using vector objects, however, involve difficult and time consuming processes to generate these results that are prone to errors. The systems and methods described provide various improvements by at least automatically detecting regions of overlapping vector objects (e.g., without the need for user intervention) and enabling intertwining of the vector objects simply based on cursor location and/or minimal user input. Furthermore, the systems and methods described reduce the time required to generate intertwined vector objects, eliminate errors in the generation and rendering of intertwined vector objects, and enable simple modification of intertwined vector objects.

In accordance with some aspects, the systems and methods described are directed to intertwining a vector objects by expanding or otherwise converting the vector objects into graphics primitives to determine outlines corresponding to the vector objects. Such vector object outlines are used to determine regions and/or zones where the vector objects overlap. Intertwining vector objects is generally a binary operation that is expressible as moving portions of vector objects (e.g., above or below) in relation to each other in a visual ordering (e.g., a z-order).

As described herein, the visual order of a portion of a particular vector object and a portion of another vector object within a detected region is determined. In one example, the visual order within the detected region is determined based on user input to a user interface of the application, for instance, a cursor location within the user interface being within a portion of the detected region that includes the particular vector object. As can be appreciated, the visual order, in an example, indicates an order of vector objects (e.g., top, bottom, above, below, etc.) within a region at the vector object level and is distinct from other visual orderings associated with other regions. In this manner, vector objects can include a first visual ordering associated with a first region and a second visual ordering distinct from the first visual ordering associated with a second region, thereby allowing for complex intertwining of vector objects across multiple overlapping regions.

In operation, aspects described herein automatically (e.g., without user intervention or other actions performed by the user) detects regions of overlapping vector objects in an image (e.g., displayed in the user interface of the application). In this regard, vector objects are used to generate corresponding graphic primitives, such as rasters and/or Bezier-bounded shapes with only fills (e.g., a single color throughout the entire vector object). Such graphic primitives can be used to obtain the outline of the vector objects graphic primitive. In some examples, the vector objects include multiple shapes that are merged or otherwise combined (e.g., union) in a Boolean operation in order to obtain the outline of the vector object. This can include merge operations with clipping masks, in some instances. In other examples where the vector objects include at least a portion of the vector object defined by an image (e.g., raster), the application traces the image with vectors and combines the vectors to get the outline for the portion of the vector object.

Upon determining outlines for the vector objects, the application performs region detection and determines a visual order for the overlapping region by at least determining the topmost (e.g., face) vector object for the detected region. In various examples, the visual order indicates an ordering of vector objects within the region (e.g., top, middle, bottom, etc.). Furthermore, in some examples, if the detected regions overlap with one or more other regions (e.g., user-generated regions), the regions are merged to generate a new region and the visual order for the region is determined based on the visual order of all the regions that intersect with the new region. Furthermore, any conflicts between the visual orders, in these examples, are resolved based on the cursor location and/or information provided by the user.

As mentioned above, in these examples, the regions are mutually exclusive and include a single visual order. Furthermore, in an example, the visual order includes the z-direction for all of the vector objects in the associated region, not simply the topmost or bottommost vector object. As such, continuing the example above, the visual order is used to render vector objects to provide the appearance of intertwining. In some examples, when rendering intertwined vector objects, minor deviations (e.g., rendering artifacts) due to precision limitations of the application and/or algorithm are displayed. In order to address such deviations, an offset of a number of pixels is added to the outline and/or boundary of the vector objects.

Turning to FIG. 1, FIG. 1 is a diagram of an operating environment 100 in which one or more embodiments of the present disclosure can be practiced. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory, as further described with reference to FIG. 11.

It should be understood that the operating environment 100 shown in FIG. 1 is an example of one suitable operating environment. Among other components not shown, operating environment 100 includes a user device 102, intertwining tool 104, and a network 106. Each of the components shown in FIG. 1 can be implemented via any type of computing device, such as one or more computing devices 1100 described in connection with FIG. 11, for example. These components can communicate with each other via network 106, which can be wired, wireless, or both. Network 106 can include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 106 is not described in significant detail.

It should be understood that any number of devices, servers, and other components can be employed within operating environment 100 within the scope of the present disclosure. Each can comprise a single device or multiple devices cooperating in a distributed environment. For example, the intertwining tool 104 includes multiple server computer systems cooperating in a distributed environment to perform the operations described in the present disclosure.

User device 102 can be any type of computing device capable of being operated by an entity (e.g., individual or organization) and obtains data from intertwining tool 104 and/or a data store that can be facilitated by the intertwining tool 104 (e.g., a server operating as a frontend for the data store). The user device 102, in various embodiments, has access to or otherwise includes an input device 112, which a user interacts with to provide an input to the application 108 (e.g., through a user interface of the application). Application 108 generally enables the user to create, edit, modify, or otherwise interact with digital content such as vector objects within a digital image 116.

In some implementations, user device 102 is the type of computing device described in connection with FIG. 11. By way of example and not limitation, the user device 102 can be embodied as a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors and one or more computer-readable media. The computer-readable media can also include computer-readable instructions executable by the one or more processors. In an embodiment, the instructions are embodied by one or more applications, such as application 108 shown in FIG. 1. Application 108 is referred to as a single application for simplicity, but in practice its functionality can be embodied by one or more applications.

In various embodiments, the application 108 includes any application capable of facilitating the exchange of information between the user device 102 and the intertwining tool 104. For example, the application 108 can provide the intertwining tool 104 with information associated with vector objects 118 rendered by the application 108 to enable the intertwining tool 104 to determine regions within the digital image 116 displayed by the application 108, including overlapping vector objects 118. In some implementations, the application 108 comprises a web application, which can run in a web browser, and can be hosted at least partially on the server side of the operating environment 100. In addition, or instead, the application 108 can comprise a dedicated application, such as an application being supported by the user device 102 and the intertwining tool 104. In some cases, the application 108 is integrated into the operating system (e.g., as a service). It is therefore contemplated herein that "application" be interpreted broadly. Some example applications include ADOBE ILLUSTRATOR®, a graphic design tool, and ADOBE PHOTOSHOP®, which allows users to view, create, manipulate, print, and manage images.

For cloud-based implementations, for example, the application 108 is utilized to interface with the functionality implemented by the intertwining tool 104. In some embodiments, the components, or portions thereof, of the intertwining tool 104 are implemented on the user device 102 or other systems or devices. Thus, it should be appreciated that the intertwining tool 104, in some embodiments, is provided via multiple devices arranged in a distributed environment that collectively provide the functionality described herein. Additionally, other components not shown can also be included within the distributed environment.

As illustrated in FIG. 1, the application 108 causes the digital image 116 to be displayed (e.g., via a display device connected to and/or integrated with the user device). Furthermore, in various embodiments, the user, through the input device 112, causes the application to generate (e.g., the user can create) the vector objects 118. In one example, the user interacts with tools, functions, and/or operations provided by the application 108 to generate the vector objects, which include geometric shapes defined on a Cartesian plane, such as points, lines, curves, and polygons that are used by the application to render the digital image 116. In the example illustrated in FIG. 1, the digital image 116 includes two or more vector objects 118 that are intertwined such that the appearance of the two or more vector objects 118 includes a portion of a first vector object that is above a portion of a second vector object. In various embodiments, the intertwining tool 104 enables automated generation of intertwined vector objects. In one example, the intertwining tool 104 includes various components such as object outlines 124, region detection 126, zone management 122, and a rendering artifact 128.

Turning to the intertwining tool 104, in an embodiment, the intertwining tool 104 detects regions within the digital image 116 that include overlapping portions of vector objects 118 that can be intertwined and causes a region indicator 130 to be displayed (e.g., when the user navigates via the input device 112 to the region). For example, the region indicator 130 indicates to the user that the vector objects 118 can be intertwined and the user can provide an input using the input device 112 to cause the intertwining tool and/or application 108 to intertwine the vector objects 118 within the region associated with the region indicator 130.

In various embodiments, in order to detect an overlapping region of vector objects within the digital image 116, the intertwining tool 104 determines the object outlines 124 associated with the vector objects 118 displayed by the application 108. In an example, the object outlines 124 include the boundaries and/or edges of the vector objects 118. As described above, the vector objects 118, in various embodiments, include path objects and compound path objects defined by geometry but can include various effects such as stroke, fill, styles, brushes, patterns, images, and various other effects. In one example, in order to determine or obtain the object outlines 124, the vector objects are converted into graphic primitives, such as rasters and Bezier-bounded shapes with only fill effects applied (e.g., vector objects 314B and 312B, as described in greater detail below in connection with FIG. 3). In other cases, for example, where the vector objects cannot be converted into graphic primitives (e.g., rasters, meshes, raster brushes, etc.), bounding boxes and/or other vector representations of the object outlines 124 are generated.

In various embodiments, once a particular vector object is converted into graphic primitives, the graphic primitives are merged into a single object to obtain the corresponding boundaries (e.g., the object outline for the particular vector object). For example, when detecting the regions where the vector objects 118 can be intertwined, the outer boundaries of the vector objects 118 are used and any internal details are not used (e.g., by merging the graphic primitives of the vector objects 118), thereby reducing the complexity of detecting the intersections between the vector objects 118 (e.g., the regions).

In various embodiments, where a particular effect added to a vector object creates non-vector objects (e.g., an image), ribs (e.g., which are defined by vectors) are generated for the non-vector object based on attributes of the effect (e.g., stroke width). In such embodiments, the ribs are non-overlapping and are combined to obtain the outline for the non-vector object. For example, as described in greater detail below in connection with FIG. 5, the outline of the ribs are combined to obtain the outline of the entire path and/or object.

In an embodiment, combining components of vector objects 118 (e.g., ribs, strokes, fills, and other geometries defined by the vector objects 118) includes Boolean operations such as merge, union, combine, join, intersect, fragment, subtract, trim, offset, and/or other operations executable by the application 108. For example, if a particular vector object includes a clipping mask, the clipping mask is merged (e.g., using the merge operation) with the rest of the particular vector object so that the outline for the particular vector object is accurately obtained. In various embodiments, clipping includes a technique used as part of digital image rendering to selectively enable and disable rendering operations with respect to the digital image 116. In one example, clipping and/or clipping masks are used to define what is rendered within a particular region.

In various embodiments, once the object outlines are determined or obtained, the intertwining tool 104 performs region detection 126 within the digital image 116. As illustrated in FIG. 1, the vector objects 118 are associated with a plurality of regions within which the vector objects 118 are capable of being intertwined. In one example, these regions are determined without user intervention (e.g., without the user providing an input through the input device 112). Overlapping regions of vector objects can be automatically detected in any number of ways. In an embodiment, the region detection 126 (e.g., including determining a visual order for the region) is performed by the intertwining tool 104 and/or application 108 using the following algorithm:

In this example, I represents the intertwine object (e.g., the set of vector objects 118 within the digital image 116 that can be modified to appear intertwined), p represents the region indicator 130 location within the digital image 116, and K represents a set of vector objects that overlap within a particular region. In this example, the intertwining tool 104 and/or application 108 determines the visual order $V_{z_i}$ associated with the region $z_i$ based on the region indicator 130 location $r_i$. For instance, if the region indicator 130 is located within a first vector object, the intertwining tool 104 modifies the visual order $V_{z_i}$ such that the first vector object is the topmost (e.g., face and/or highest z-order) within the region $z_i$. In an embodiment, the algorithm above is implemented by the intertwining tool 104 and/or application to determine the "face" (e.g., topmost) vector object for a particular region based on the region indicator 130 location being within a particular vector object of K. For example, determining the face for a particular region is described below in connection with FIGS. 6A-6C.

Furthermore, in an example, the visual order $V_{z_i}$ is determined at the vector object level. In one example, the regions $z_i$ are mutually exclusive and have a single visual order $V_{z_i}$. In such an example, the region $z_i$ overlaps with a region generated by the user (e.g., using the input device 112, the regions are merged and a single visual order $V_{z_i}$ is assigned to the merged region). In various embodiments, the visual order $V_{z_i}$ is determined using a ternary operator. Furthermore, if the user provides additional input through the input device 112 (e.g., the user clicks within the region), the intertwining tool 104 and/or the application 108 can cycle or otherwise toggle the topmost vector object within the visual order $V_{z_i}$.

Figures 8A, 8B:
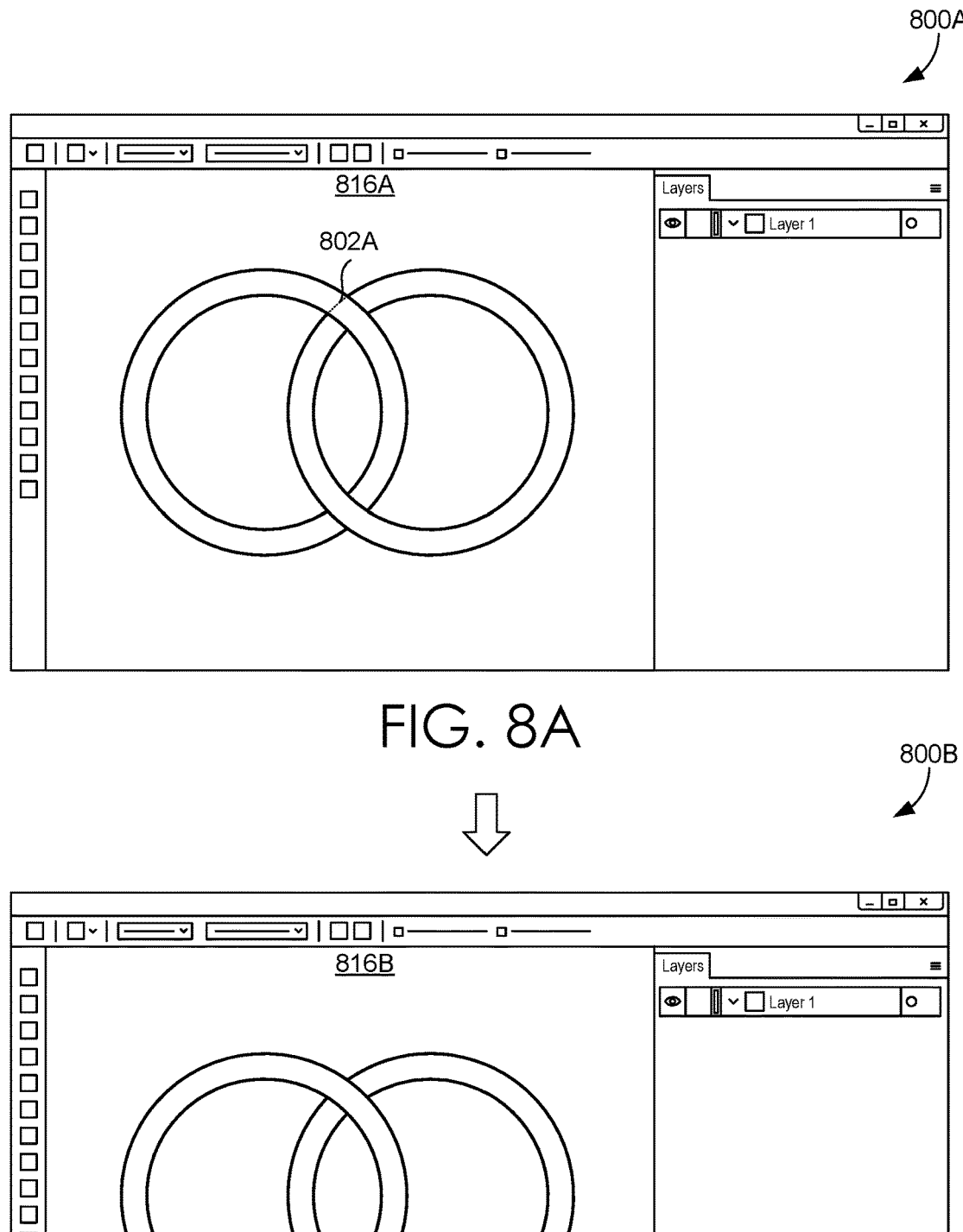
FIG. 8A depicts an environment in which an application removes rendering artifacts from an image, in accordance with at least one embodiment.
FIG. 8B depicts an environment in which an application removes rendering artifacts from an image, in accordance with at least one embodiment.

In an embodiment, once the visual order for a particular region of the intertwine object is determined based on user input, the intertwining tool 104 and/or the application 108 eliminates rendering artifacts and/or deviations. In one example, as illustrated in FIGS. 8A and 8B, the algorithms used to render the digital image 116 include precision limitations that create artifacts. As a result the intertwining tool 104 and/or the application 108 add an offset to the object outlines 124 to remove the rendering artifacts. In an embodiment, the intertwining tool 104 and/or the application 108 transforms the object outlines 124 into a pixel space based on a transformation matrix, computes an offset path by x pixel (e.g., one pixel width), and then transforms the object outlines 124 (e.g., including the offset path) based on an inverse transformation matrix.

The techniques described, in various embodiments, comply with a variety of rendering techniques for a variety of graphic objects in Portable Document Format (PDF) 1.7, the

---

Algorithm for detecting region boundary

Require: I, p   ▷I: intertwine object, an p :cursor location and K vector objects to consider for
face computation
1: procedure COMPUTINGFACEBOUNDARY (I, p, K)
2:    $o_i$ ← $i_{th}$ vector object of intertwine.
3:    $z_i$ ← $j_{th}$ region of intertwine
4:    Σ ← top K vector object
5:    for each $z_i$ do
6:       if p inside $z_i$ then
7:          Fill Σ using $V_{z_i}$
8:          Break
9:    R ← Compute intersection among objects in Σ
10:   for each $r_i$ in R do
11:      if p lies in $r_i$ then return $r_i$
12:   return sixth edition of the PDF specification that became ISO 32000-1 (e.g., direct and indirect objects), including complex appearances such as nested clipping groups, transparency groups and opacity masks, and other effects and/or appearances. Further, the intertwining tool 104 and/or the application 108 are capable of generating intertwined appearances from vector objects 118 having graphics with complex appearances and are scalable to render nested intertwined appearances, such as in the digital image 116.

In various embodiments, a visual order and/or a modified visual order (e.g., based on additional user input) of a portion of the particular vector object and a portion of the additional vector object within the region is computed based on the visual order and the cursor location. For example, the portion of the particular vector object appears above the portion of the additional vector object in the visual order and the portion of the particular vector object appears below the portion of the additional vector object in the modified visual order.

In various embodiments, the intertwining tool 104 generates a mask based on a particular region, which defines what is to be rendered inside the particular region (e.g., where pixels are to be rendered and not rendered with respect to the rendering of the digital image 116). Furthermore, in such embodiments, the intertwining tool 104 identifies which of a plurality of the vector objects 118 are at least partially included within the region. As described above, in various examples, the visual ordering (e.g., z-ordering) of the identified vector objects within the region is determined.

In some embodiments, a clipping group is used as a basis to control rendering of the vector objects 118 that are included within the region, as well as a visual order of the vector objects 118 within the region in a nondestructive manner. In an example, the clipping group is displayed in the user interface, which includes representations of the respective vector objects 118 (e.g., by shape, color, pattern, etc.). The representations are further configurable, in this example, to indicate the visual ordering (e.g., are displayed in an order according to a visual ordering of the vector objects 118). Furthermore, in various embodiments, the display includes a representation of the region (e.g., the zone including the overlapping vector objects 118), as illustrated in FIG. 2A.

The application 108 supports user interaction via the user interface to edit the intertwined object. For example, this includes changes to the visual ordering and as such supports an ability to define which of the vector objects overlap other vector objects within the region. In various embodiments, the user interacts with the input device 112 (e.g., a mouse, a stylus, a touchscreen, a keyboard, etc.) to provide input through a user interface of the application 108. In an example, the user interacts with the input device 112 to select regions including overlapping vector objects 118 displayed in the user interface of the application 108. In this example, by clicking or otherwise interacting with a particular region, the application 108 or other component illustrated in FIG. 1 (e.g., the intertwining tool 104), in response to the user input, modifies the visual order associated with the vector objects 118 such that the vector objects 118 are intertwined (e.g., a portion of a first vector object is displayed above a second vector object within the region).

Figures 2A, 2B:
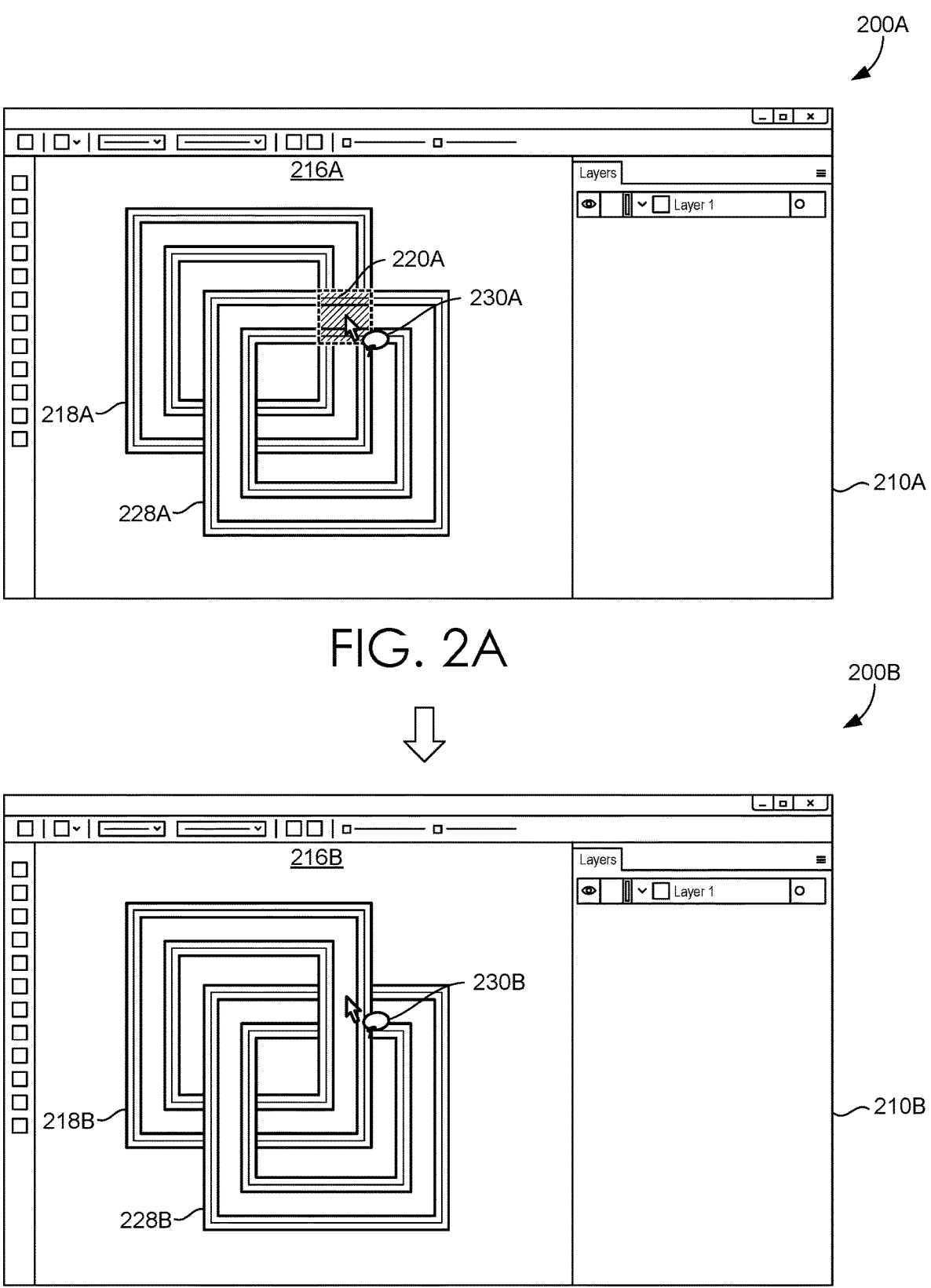
FIG. 2A depicts an environment in which an application performs intertwining of vector objects, in accordance with at least one embodiment.
FIG. 2B depicts an environment in which an application performs intertwining of vector objects, in accordance with at least one embodiment.

FIGS. 2A and 2B illustrate environments 200A and 200B, in which an application performs intertwining of vector objects, in accordance with at least one embodiment. In various embodiments, the application enables a user to control a visual ordering of vector objects within the digital image 216A and 216B. For example, the application renders the vector objects (e.g., a first vector object 218A and 218B and a second vector object 228A and 228B) based on an input from the user provided through a user interface 210A and 210B. As illustrated in FIG. 2B, an intertwined vector object (e.g., the combination of the first vector object 218B and the second vector object 228B) is generated by the application and includes a connection between the first vector object 218B and the second vector object 228B that are intertwined together such that the first vector object 218B and the second vector object 228B overlap and/or intersect through each other within region 220A. In other examples, the vector objects can include multiple overlaps in a z-direction at a plurality of different regions. In the example illustrated in FIGS. 2A and 2B, the user interface 210A and 210B, interlocking squares are shown in which each vector object is displayed as overlapping and intersecting another vector object at one location and underlying the same vector object at another location.

In various embodiments, the region 220A is detected by the application and/or component of the application based on outlines of the first vector object 218A and the second vector object 228A. In one example, the first vector object 218A and the second vector object 228A are converted by the application into graphic primitives, and the outlines of the objects are determined based on the geometry associated with the graphic primitives. In various embodiments, detection of the region 220A is performed without intervention from the user (e.g., automatically upon the rendering of the first vector object 218A and the second vector object 228A).

In an embodiment, the application causes the user interface 210A to display the region 220A and the region indicator 230A based on detection of the region 220A. In this embodiment, the user can initiate an intertwined vector object editing operation (e.g., via selection in a menu and/or via receipt of a user input within the region 220A). The user interface 210A, for example, receives an input through an interaction with the region indicator 230A (e.g., clicking within the region, selection of a representation of the intertwined vector object editing operation, a "right click" menu, selection from a menu bar, or other graphic element of the user interface 210A).

In various embodiments, by interacting with the region indicator 230A, the user manipulates a visual ordering of the first vector object 218A and the second vector object 228A. In one example, the visual ordering defines a z-ordering of the vector objects within a particular region (e.g., the first vector object 218A and the second vector object 228A within the region 220A), and thus overlaps with the identified and/or selected vector objects within the particular region. In an embodiment, the visual ordering is edited through interaction with the region indicator 230A in the user interface 210A. An input (e.g., the user clicking a button on a mouse or other input device), for example, is received that specifies a location with the region 220A corresponding to the first vector object 218A. In this example, the input causes the first vector object 218B to be displayed above the second vector object 228B in the user interface 210B, as shown in FIG. 2B. This is in contrast to the visual ordering of the first vector object 218A and the second vector object 228A, as illustrated in FIG. 2A.

Figures 3A, 3B:
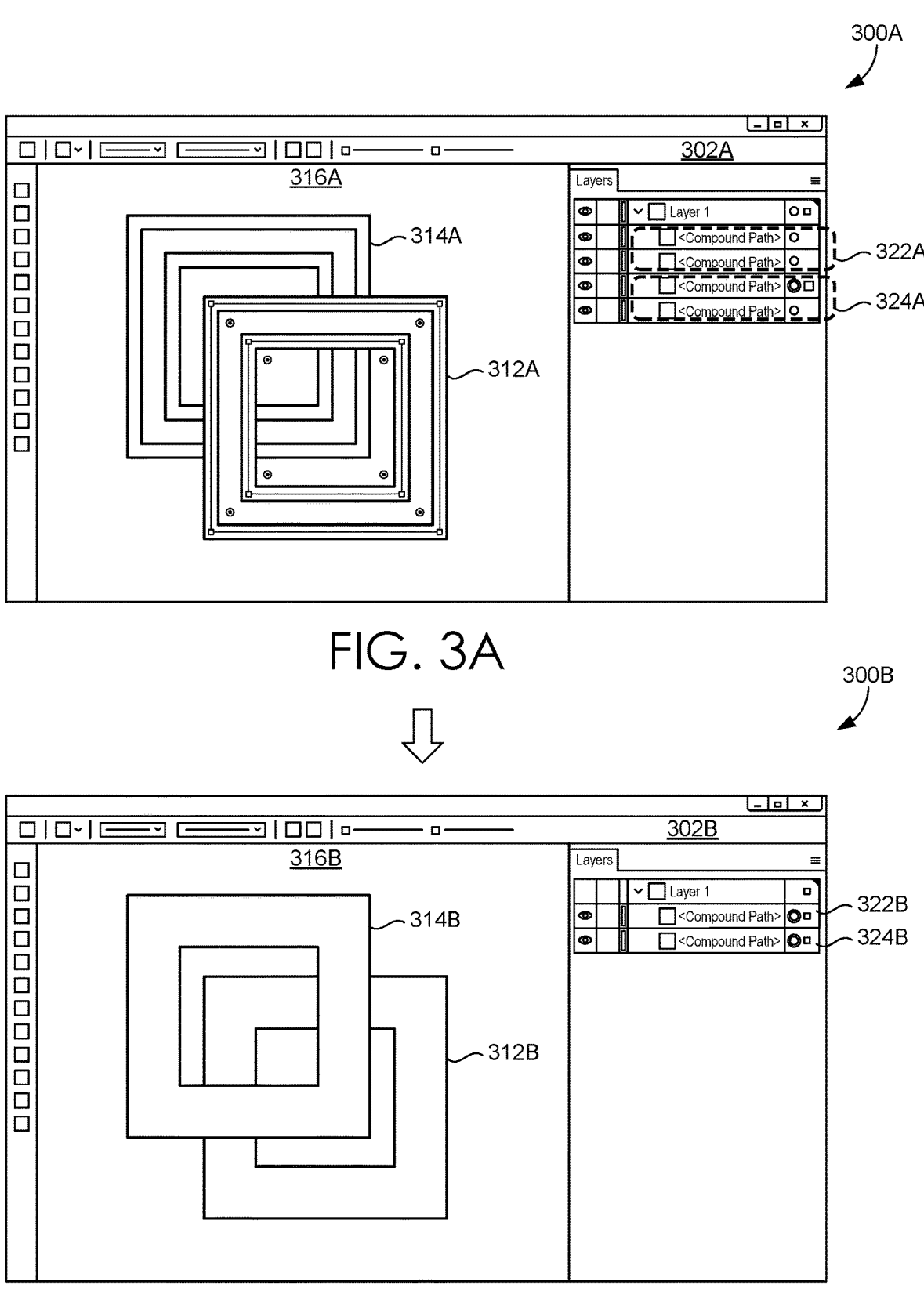
FIG. 3A depicts an environment in which an application generates graphic primitives based on vector objects, in accordance with at least one embodiment.
FIG. 3B depicts an environment in which an application generates graphic primitives based on vector objects, in accordance with at least one embodiment.

FIGS. 3A and 3B illustrate environments 300A and 300B in which an application or component thereof, such as the intertwining tool 104 described above in connection with FIG. 1, determines the outline and/or boundaries for vector objects within a digital image 316A, in accordance with at least one embodiment. In various embodiments, the application determines a set of outlines for a set of vector objects within the digital image 316A. For example, the application converts or otherwise transforms complex vector objects, such as a first vector object 314A and a second vector object 312A, to graphic primitives which are combined to determine the outlines of the first vector object 314A and the second vector object 312A, such as a first outline 314B and a second outline 312B.

In an embodiment, menus 302A and 302B in the example illustrated in FIGS. 3A and 3B are used to display representations of the vector objects, including components of the vector objects in a user interface of the application. The menu 302A, for example, includes a first representation 322A of shapes, paths, or other components (e.g., based on user input) that defines the first vector object 314A and a second representation 324A of shapes, paths, or other components that defines the second vector object 312A. In addition, in some examples, the first representation 322A and the second representation 324A include representations of various components of the first vector object 314A and the second vector object 312A. In an embodiment, the first representation 322A and the second representation 324A include representations of shapes, paths, effects, patterns, strokes, fills, brushes, or other components of vector objects. In the example illustrated in FIGS. 3A and 3B, the menus 302A and 302B indicate a top/down visual ordering of the vector objects (e.g., the first vector object 314A and the second vector object 312A) and components thereof. A variety of other examples are also contemplated, including nesting of the representations, a tree structure, overlaps, and so forth.

In various embodiments, the application converts the first vector object 314A and the second vector object 312A into graphic primitives, such as the graphic primitives displayed in the first representation 322A and the second representation 324A. In one example, the graphic primitives are combined (e.g., using a Boolean operation such as merge, union, combine, unite, etc.), as shown in a first representation 322B and a second representation 324B. Furthermore, in such an example, the first representation 322B and the second representation 324B correspond to the first outline 314B and the second outline 312B. In various embodiments, the first outline 314B and the second outline 312B are vector objects generated as a result of merging or otherwise combining components of the first vector object 314A and the second vector object 312A. As described above, the first outline 314B and the second outline 312B, in various embodiments, are used to determine regions of overlapping vector objects to enable the user to intertwine the vector objects (e.g., the first vector object 314A and the second vector object 312A).

Figure 4A:
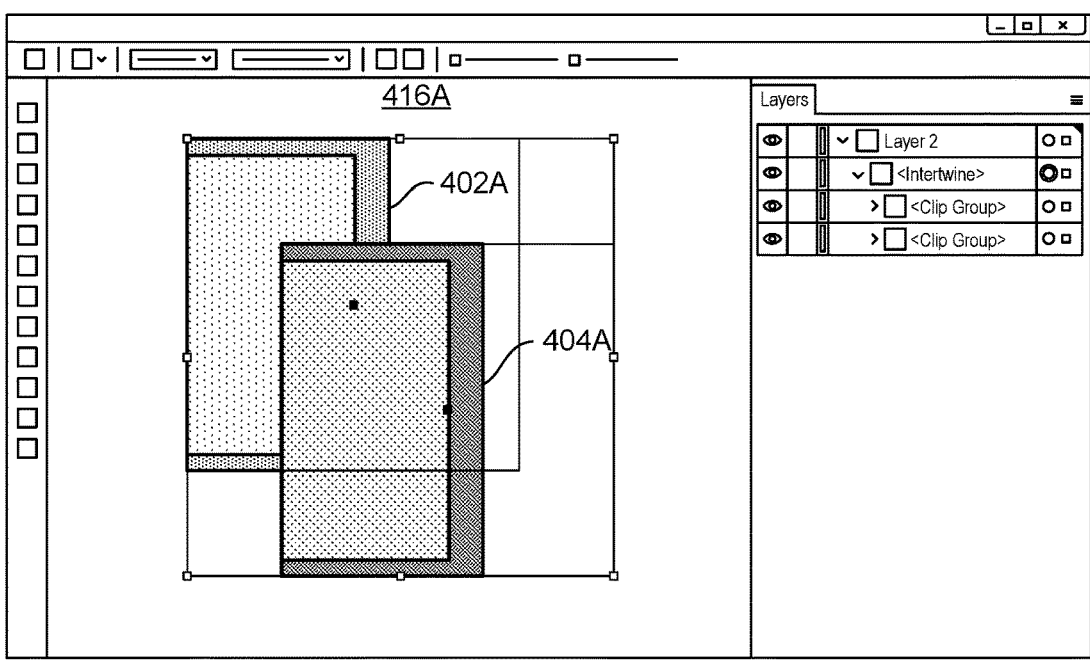
FIG. 4A depicts an environment in which an application performs intertwining of vector objects including clipping masks, in accordance with at least one embodiment.
Figure 4B:
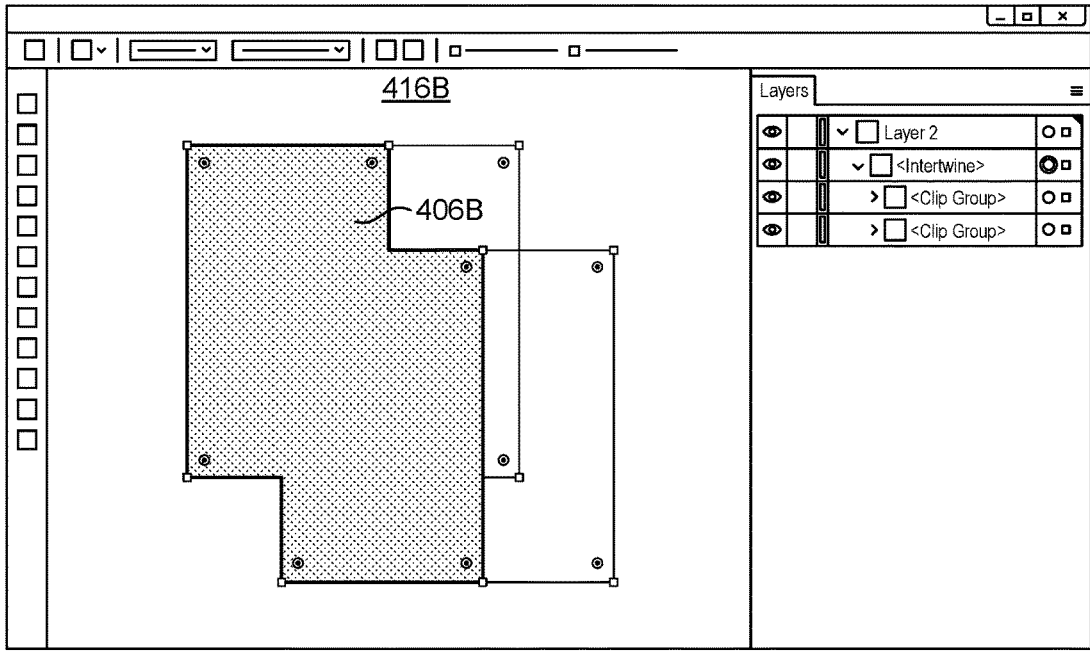
FIG. 4B depicts an environment in which an application performs intertwining of vector objects including clipping masks, in accordance with at least one embodiment.

FIGS. 4A and 4B illustrate environments 400A and 400B in which an application or component thereof, such as the intertwining tool 104 described above in connection with FIG. 1, determines outlines and/or boundaries for vector objects, including clipping masks, within a digital image 416A, in accordance with at least one embodiment. In various embodiments, the application determines a set of outlines for a set of vector objects within the digital image 416A. In the example illustrated in FIGS. 4A and 4B, a vector object 406A includes a clipping mask 402A or similar component that causes the application to fill an enclosed shape with images and/or graphics within the shape without displaying and/or rendering the images and/or graphics outside of the enclosed shape.

In various embodiments, to differentiate from the clipping mask 402A for the vector object 406A, the clipping mask 402A is merged with the vector object 406A. For example, the clipping mask 402A is merged with the vector object 406A prior to converting the vector object 406A to graphic primitives to determine the outline for the vector object 406B. In another embodiment, the vector object 402 is converted into graphic primitives that are merged with the clipping mask 402A, and the resulting graphic primitives are united (e.g., the unite Boolean function) or otherwise combined to determine the outline for the vector object 406B. As described above, the outlines of the vector object 406B, in various embodiments, are used to determine regions of overlapping vector objects to enable the user to intertwine the vector objects.

Figure 5:
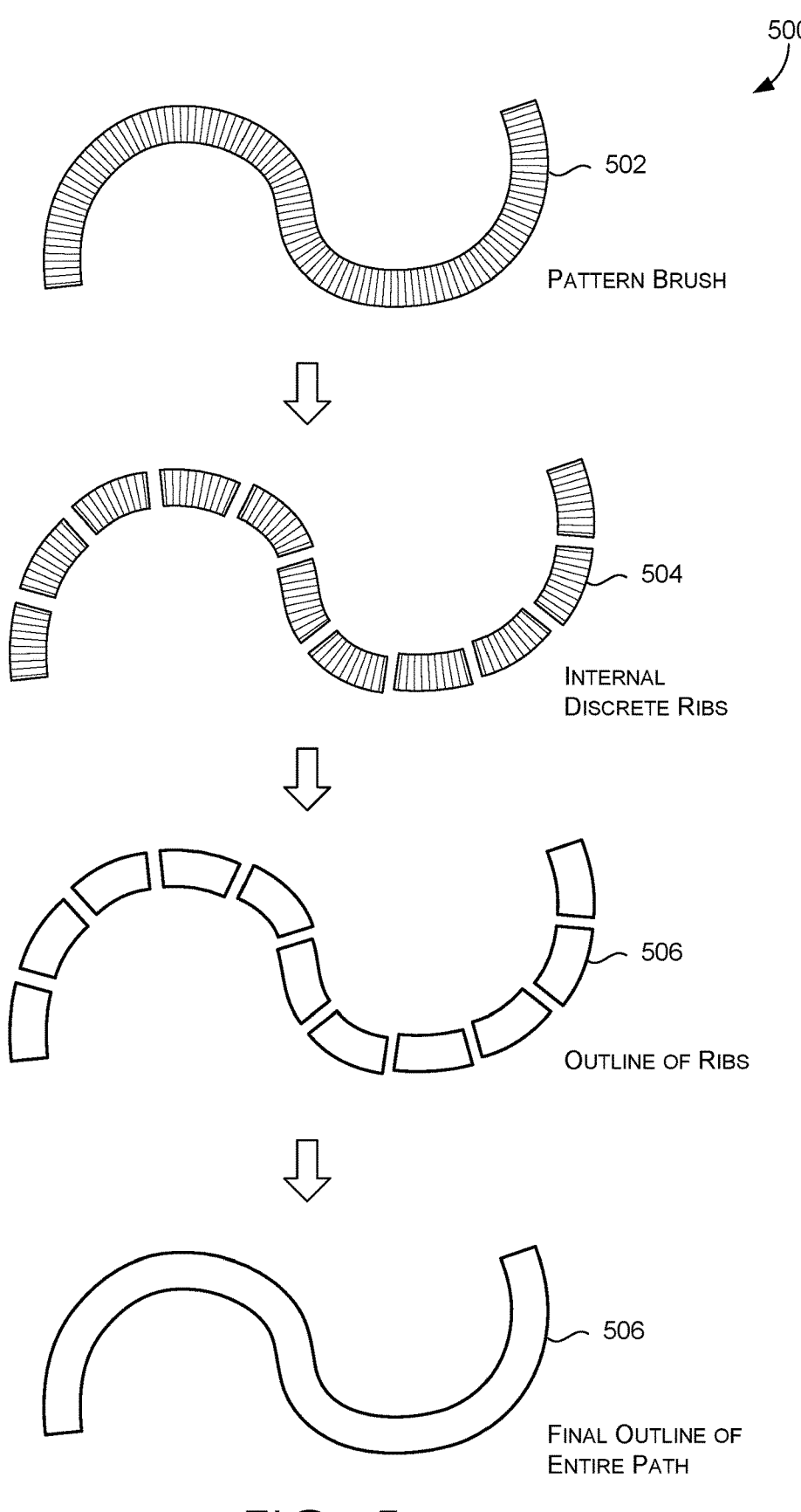
FIG. 5 depicts an environment in which an outline for an image is determined, in accordance with at least one embodiment.

FIG. 5 illustrates an environment 500 in which an application determines an outline for a vector object including a pattern brush 502 effect, in accordance with at least one embodiment. In various embodiments, the pattern brush 502 generates an object and/or output that is not defined by vectors. For example, the application, when generating an object based on the pattern brush 502, generates a set of ribs over which a stroke is used to apply the pattern brush 502 (e.g., an image selected by a user of the application). In such an example, the application generates the ribs such that the ribs are mutually non-overlapping and form a path and/or object generated by the user (e.g., based on user input).

In an embodiment, the application determines the outline for the vector object by at least determining the outline for the set of internal discrete ribs 504 that form the vector object, including the pattern brush 502. In one example, the set of internal discrete ribs 504 are converted into graphic primitives, as described above, and the graphic primitives are used to determine the outline of the ribs 506 (e.g., the boundaries of the ribs as defined by the vector object). In various embodiments, the outline of the ribs 506 are combined to determine the outline associated with the object 506. For example, the outline of the ribs 506 (e.g., the set of vector objects defining the ribs converted into graphic primitives and combined using a Boolean operation) are merged into a single vector object and/or path that corresponds to the vector object generated using the pattern brush 502. In various embodiments, the outline of the object 506 is used to determine regions of overlapping vector objects, as described above.

Figure 6C:
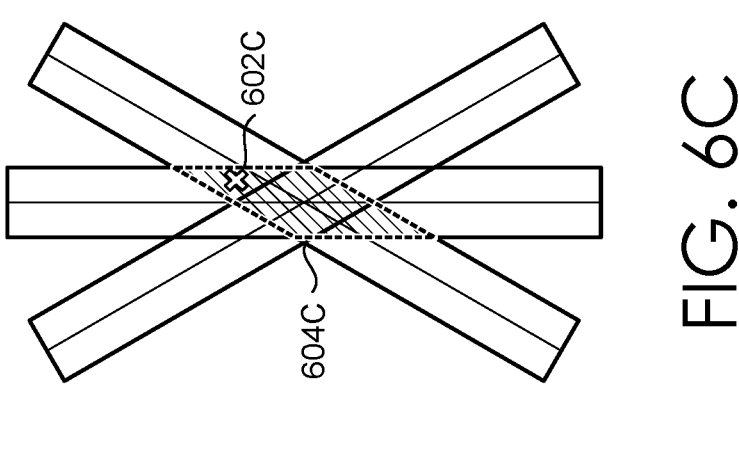
FIG. 6A-6C depicts an environment in which an application determines a face for intertwining of vector objects, in accordance with at least one embodiment.
Figure 6B:
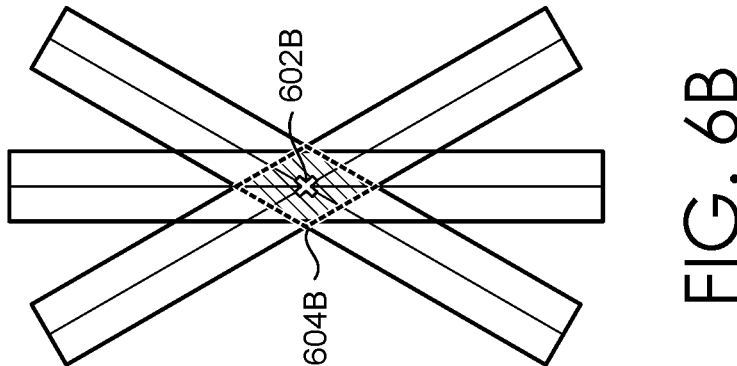
Figure 6A:
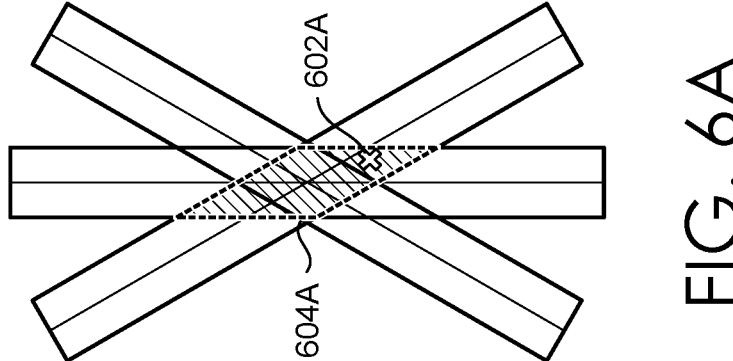

FIGS. 6A-6C illustrate environments 600A-600C, in which an application determines a face for a region 604A-604C of intertwining vector objects based on a cursor location 602A-602C, in accordance with an embodiment. In various embodiments, an intertwined group (e.g., a set of vector objects that includes at least one region within which two or more vector objects of the set of vector objects overlap) includes regions 604A-604C, which include different numbers of objects to be intertwined in different regions. In various embodiments, the user causes the application to create an intertwined group where in a first region, two vector objects overlap, and in a second region, three vector objects overlap. In various embodiments, the user decides the number of vector objects to intertwine, based on the cursor location 602A-602C.

For example, as illustrated in FIGS. 6A and 6C, there are two vector objects that overlap in the region 604A and 604C, indicated by the cursor location 602A and 602C. In another example, as illustrated in FIG. 6B, there are three vector objects that overlap in the region 604B, indicated by the cursor location 602B. In various embodiments, as described above, K indicates the number of vector objects used to determine overlapping regions. For example, the intent of the user to determine the visual order for a region of overlapping vector objects is obtained by the application based on user input such as modifier keys, touch and gestures, or other inputs obtained from an input device.

In various embodiments, the application computes or otherwise determines the visual order and/or topmost vector object of a particular intertwine group where different regions contain a different number of vector objects contributing to visual rearrangement operation associated with the region 604A-604C. In one example, the number of vector objects is determined by the cursor location 602A-602C. In an embodiment, mouse hover provides the cursor location 602A-602C and indicates the vector objects to be considered when generating the overlapping region and/or the visual order for the region. As illustrated in FIG. 6A, the cursor location 602A indicates that two vector objects are considered for determining the visual order for the region 604A. Alternatively, as illustrated in the example in FIG. 6B, the cursor location 602B indicates that three vector objects are considered for determining the visual order for the region 604B.

Figures 7A, 7B:
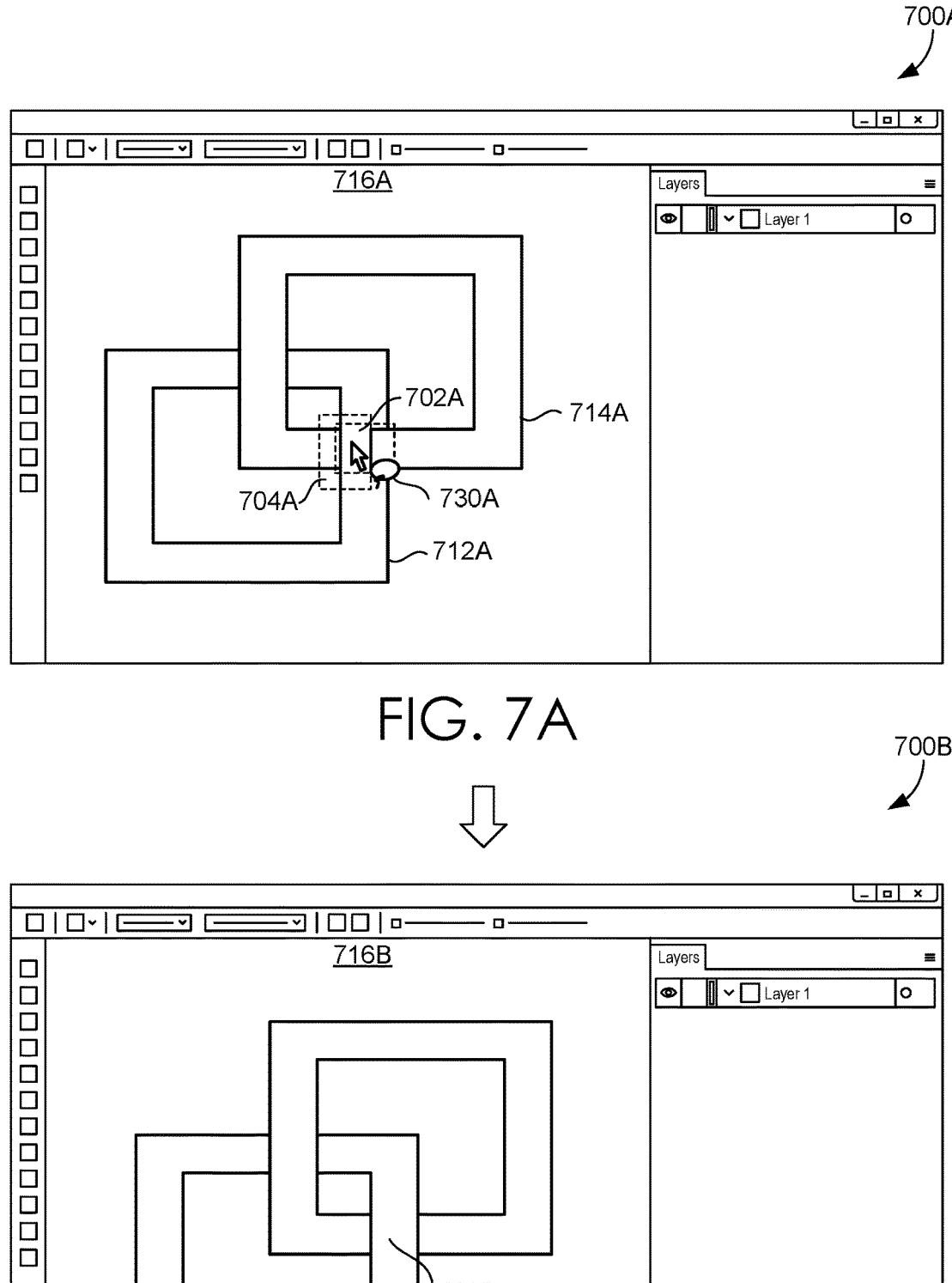
FIG. 7A depicts an environment in which an application performs intertwining of vector objects, in accordance with at least one embodiment.
FIG. 7B depicts an environment in which an application performs intertwining of vector objects, in accordance with at least one embodiment.

FIGS. 7A and 7B illustrate environments 700A and 700B in which an application or component thereof, such as the intertwining tool 104 described above in connection with FIG. 1, merges regions, including regions generated by a user within a digital image 716A, in accordance with at least one embodiment. In various embodiments, the application enables users to generate regions for intertwining vector objects using an input device such as a mouse. Furthermore, in such embodiments, the user-generated regions can include only a portion of the area in which two or more vector objects overlap. For example, as illustrated in FIG. 7A, a first region 704A is generated based on a user input and includes a portion of the overlapping area between a first vector object 714A and a second vector object 712A. In addition, in the example illustrated in FIG. 7A, a second region 702A is detected by the application without user intervention (e.g., automatically) and overlaps at least in part with the region 704A, generated based on the user input.

In various embodiments, the first region 704A and the second region 702A are mutually exclusive and a visual order of portions of vector objects included in the first region 704A is consistent within the first region 704A. Similarly, in these embodiments, a visual order of portions of vector objects included in the second region 704B is consistent within the second region 704B. In one example, the application leverages the properties of mutual exclusivity of regions and/or zones and consistency of a visual order of partial vector objects included in the regions or zones to compute modified visual orders of the partial vector objects included in the regions or zones automatically and without user intervention, in some scenarios.

In various embodiments, in order to maintain mutually exclusive regions and consistency of the visual order for vector objects, the application merges the first region 704A and the second region 702A to generate the intertwined vector object 706B in a digital image 716B. Furthermore, in such embodiments, a single visual order for the region resulting from merging the first region 704A and the second region 702A is determined. In one example, the visual order is obtained from the visual order associated with the first region 704A or the second region 702A. In another example, the visual order is determined based on a region indicator 730 and/or a location of the region indicator 730 relative to the first vector object 714A and the second vector object 712A.

FIGS. 8A and 8B illustrate environments 800A and 800B in which an application or component thereof, such as the intertwining tool 104 described above in connection with FIG. 1, removes rendering artifacts from digital images 816A and 816B, in accordance with at least one embodiment. In various embodiments, the application, when determining the outlines for a vector object, generates an artifact 802A (illustrated in FIG. 8A as a dashed line). In one example, computation of the region boundaries includes Boolean operations between shapes (e.g., vector objects), which can cause minor deviations due to precision limitations of underlying machine and algorithmic heuristics (e.g., floating point comparisons) used by the application to render the digital image 816A.

In various embodiments, to remove the artifact 802A, an offset is determined and application to the outlines of the vector objects are used to detect the regions of overlapping vector objects. In one example, a one-pixel offset is determined and applied to the outlines of the vector objects to generate the digital image 816B without the artifact 802A.

Figure 9:
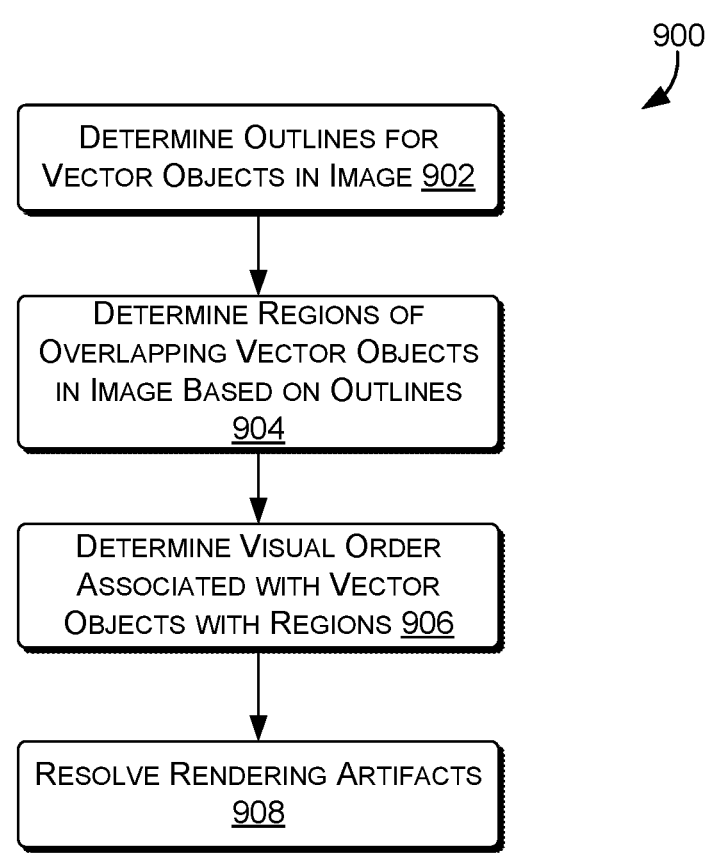
FIG. 9 depicts an example process flow for intertwining of vector objects, in accordance with at least one embodiment.

FIG. 9 is a flow diagram showing a method 900 for detecting regions within a digital image, including two or more vector objects that can be intertwined, and intertwining the vector objects in accordance with at least one embodiment. The methods 900 and 1000 can be performed, for instance, by the intertwining tool 104 of FIG. 1. Each block of the methods 900 and 1000 and any other methods described herein comprise a computing process performed using any combination of hardware, firmware, and/or software. For instance, various functions can be carried out by a processor executing instructions stored in memory. The methods 900 and 1000 can also be embodied as computer-usable instructions stored on computer storage media. The methods can be provided by a stand-alone application, a service or hosted service (stand-alone or in combination with another hosted service), or a plug-in to another product, to name a few.

As shown at block 902, the system implementing the method 900 determines outlines for a set of vector objects in the digital image. As described above in connection with FIG. 1, in various embodiments, an application or component thereof (e.g., intertwining tool) displaying the digital image determines outlines for vector objects in the digital image by at least converting or otherwise transforming the vector objects to graphic primitives and merging the graphic primitives to determine outlines associated with the vector objects. In one example, the outlines of the vector objects represent the boundaries of the vector objects in the digital image.

At block 904, the system implementing the method 900 determines regions of overlapping vector objects in the image based on the outlines. For example, the application determines regions or zones of the digital image that includes two or more vector objects based on the outlines of the vector objects determined at block 902. At block 906, the system implementing the method 900 determines the visual order associated with the vector objects with the regions detected in block 904. For example, based on a cursor location and/or other input obtained from an input device, the visual order is determined based at least in part on user input. In various embodiments, the visual order is determined at a vector object level.

In various embodiments, the visual order causes the application to display the vector objects such that the appearance of the vector objects are intertwined within the digital image. At block 908, the system implementing the method 900 resolves rendering artifacts in the digital image.

As described above, in some examples, the application, when rendering intertwining objects, includes rendering artifacts or other minor deviations. As a result, in various embodiments, the application adds an offset to the outlines of the vector objects to remove the rendering artifacts. For example, an offset of one pixel is added to the outlines of the vector objects to eliminate rendering artifacts.

Figure 10:
FIG. 10 depicts an example process flow for determining an outline of a vector objects, in accordance with at least one embodiment.
Figure 10:
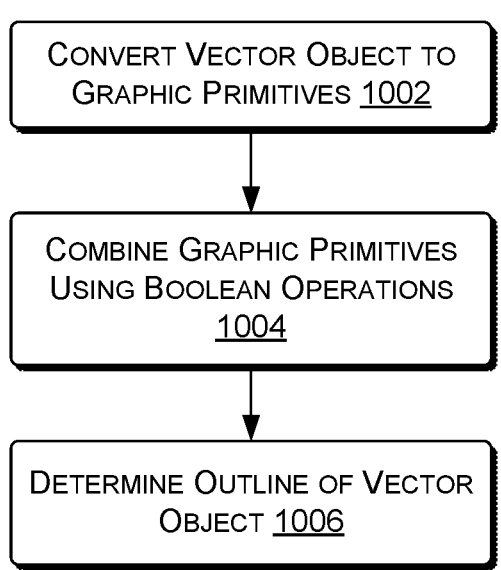

FIG. 10 is a flow diagram showing a method 1000 for determining an outline of a vector object in accordance with at least one embodiment. As described above, vector objects render by an application, in various embodiments, can be intertwined based on regions including overlapping vector objects detected based on the outlines of the vector objects. As shown at block 1002, the system implementing the method 1000 converts a vector object to graphic primitives. For example, the vector object includes a set of graphic primitives that define the geometry of the vector object.

At block 1004, the system implementing the method 1000 combines the graphic primitive using Boolean operations. In one example, the system implementing the method 1000 combines the graphics primitives using a merge operation. At block 1004, the system implementing the method 1000 determines the outline for the vector object based on a result of combining the graphic primitives. For example, the combined graphic primitives defined the geometry of the outline of the vector object.

Figure 11:
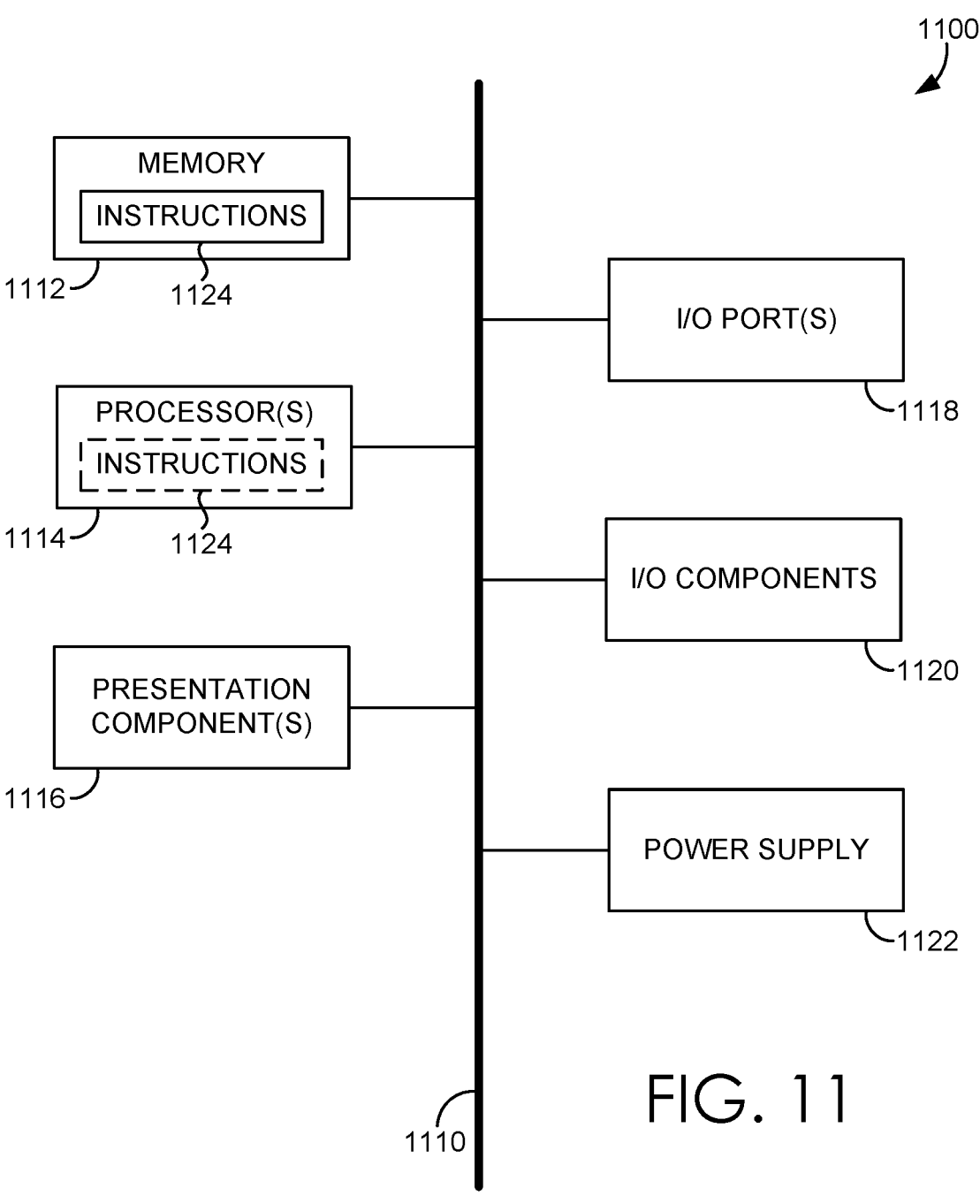
FIG. 11 is a block diagram of an exemplary computing environment suitable for use in implementations of the present disclosure.

Having described embodiments of the present invention, FIG. 11 provides an example of a computing device in which embodiments of the present invention may be employed. Computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more buses (such as an address bus, data bus, or combination thereof). Although the various blocks of FIG. 11 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 11 is merely illustrative of an exemplary computing device that can be used in connection with one or more embodiments of the present technology. Distinction is not made between such categories as "workstation," "server," "laptop," "handheld device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1112 includes computer storage media in the form of volatile and/or non-volatile memory. As depicted, memory 1112 includes instructions 1124. Instructions 1124, when executed by processor(s) 1114, are configured to cause the computing device to perform any of the operations described herein, in reference to the above-discussed figures, or to implement any program modules described herein. The memory may be removable, non-removable, or a combination thereof. Exemplary hardware devices include solid-state memory, hard drives, optical-disc drives, etc. Computing device 1100 includes one or more processors that read data from various entities, such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices, including I/O components 1120, some of which may be built in. Illustrative components include a microphone, joystick, game pad, satellite dish, scanner, printer, wireless device, etc. I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1100. Computing device 1100 may be equipped with depth cameras, such as stereoscopic camera systems, infrared camera systems, RGB camera systems, and combinations of these for gesture detection and recognition. Additionally, computing device 1100 may be equipped with accelerometers or gyroscopes that enable detection of motion. The output of the accelerometers or gyroscopes may be provided to the display of computing device 1100 to render immersive augmented reality or virtual reality.

Embodiments presented herein have been described in relation to particular embodiments, which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method comprising:
determining a first outline for a first vector object rendered by an application by merging a first set of graphic primitives of the first vector object and a second outline for a second vector object rendered by the application by merging a second set of graphic primitives of the second vector object;
determining, using the first outline and the second outline, a region including a first portion of the first outline of the first vector object that overlaps with a second portion of the second outline of the second vector object such that the first vector object and the second vector object are renderable to have an appearance of being intertwined;
determining, for the region, a visual order for the first vector object and the second vector object based on a selection, via a user interface, of one of the first vector object and the second vector object; and
causing the region to be rendered based on the visual order such that the first vector object and the second vector object visually appear intertwined based on a z-ordering indicated in the visual order, where the z-ordering indicates whether the first portion of the first outline of the first vector object or the second portion of the second outline of the second vector object is rendered within the region.

2. The method of claim 1, wherein determining the region further comprises determining the region without obtaining user input from an input device associated with the user interface of the application.

3. The method of claim 1, wherein the method further comprises removing a rendering artifact associated with the region by at least modifying the first outline of the first vector object.

4. The method of claim 1, wherein determining the first outline of the first vector object further comprises:
merging a set of components of the first vector object to generate a merged vector object; and
determining the first outline for the first vector object based on a boundary of the merged vector object.

5. The method of claim 1, wherein the first vector object includes a clipping mask; and
wherein determining the first outline for the first vector object further comprises:
merging a plurality of components of the first vector object, including the clipping mask, to generate a merged vector object; and
determining the first outline of the first vector object based on the merged vector object.

6. The method of claim 1, wherein the first vector object includes an image; and
wherein determining the first outline for the first vector object further comprises:
generating a set of vectors that correspond to a boundary of the image; and
combining the set of vectors to generate the first outline of the first vector object.

7. The method of claim 1, wherein determining the visual order further comprises causing the first vector object to be a topmost vector object within the z-ordering based on a cursor location being within a boundary of the first vector object.

8. A non-transitory computer-readable medium storing executable instructions embodied thereon, that, as a result of being executed by a processing device, cause the processing device to perform operations comprising:
determining a first outline for a first object and a second outline for a second object;
determining a region, of a user interface of an application displaying a digital image, including a portion of the first object that overlaps with a portion of the second object based on the first outline and the second outline at least partially overlapping within the region, wherein the region is determined without user input to the application;
determining a visual order associated with the first object and the second object based on an input device associated the user interface of the application, where the visual order indicates a topmost object; and
causing the first object and the second object to be rendered by the application based on the visual order to provide an intertwined appearance of the first object and the second object by at least rendering the first object or the second object as the topmost object.

9. The medium of claim 8, wherein the executable instructions further cause the processing device to perform the operations comprising removing a rendering artifact within the region by at least modifying the first outline.

10. The medium of claim 9, wherein modifying the first outline further comprises increasing the first outline by a number of pixels.

11. The medium of claim 8, wherein determining the first outline further comprises:
converting the first object to a set of graphic primitives; and
merging the set of graphic primitives.

12. The medium of claim 8, wherein the input device associated the user interface of the application provides data indicating a cursor location within the user interface; and wherein the visual order is determine based at least in part on the cursor location being within the first outline of the first object.

13. The medium of claim 12, wherein causing the first object and the second object to be rendered by the application based on the visual order further comprises causing the first object to be displayed above the second object based on the cursor location being within the first outline.

14. The medium of claim 8, wherein the first object and the second object overlap within at least one other region, where the at least one other region is associated with a second visual order distinct from the visual order.

15. The medium of claim 8, wherein the first object include a clipping mask; and wherein determining the first outline for the first object further comprises performing a union operation between the clipping mask with the first object.

16. A system comprising:

a memory component; and a processing device coupled to the memory component, the processing device to perform operations comprising:

determining a plurality of outlines corresponding to a plurality of vector objects by, for each vector object, merging graphic primitives associated with the corresponding vector object;

automatically determining a region, including a plurality of portions of at least two of the plurality of vector objects that overlap, based on the plurality of outlines corresponding to the plurality of vector objects, wherein the region is determined without user input to an application displaying the plurality of vector objects;

determining, for the region, a visual order for the at least two of the plurality of vector objects that overlap based on information obtained from an input device associated with the application;

causing the at least two of the plurality of vector objects that overlap to be displayed based on the visual order in the region to provide an intertwined appearance of the at least two of the plurality of vector objects, where the visual order indicates a topmost object of the at least two of the plurality of vector object to be rendered within the region; and removing a rendering artifact associated with a vector object, of the at least two of the plurality of vector objects that overlap, by modifying an outline, of the plurality of outlines, associated the vector object.

17. The system of claim 16, wherein the region does not overlap with at least one other region including overlapping vector objects of the plurality of vector objects.

18. The system of claim 16, wherein the processing device further performs the operations comprising merging the region with at least one other region including overlapping vector objects of the plurality of vector objects.

19. The system of claim 16, wherein the processing device further performs the operations comprising merging the region with at least one other region generate based on an input obtained from the input device associated with the application indicating a region outline of the at least one other region.

20. The system of claim 19, wherein the visual order for the region is maintained when merging the region with the at least one other region.

* * * * *